E. B. BEACH.
Metal-Turning Tools.
No. 150,276.            Patented April 28, 1874.
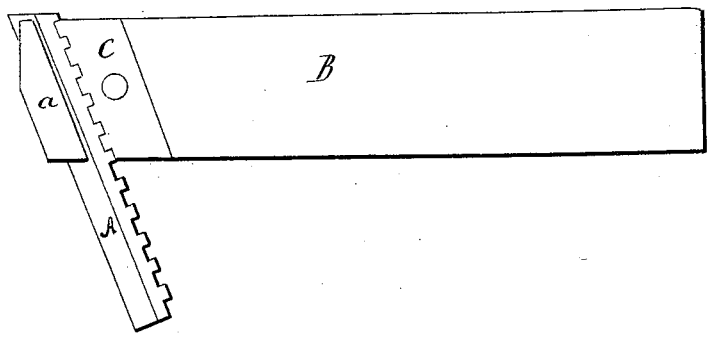
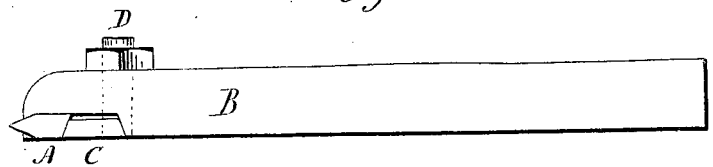

UNITED STATES PATENT OFFICE.

EDGAR B. BEACH, OF WEST MERIDEN, CONNECTICUT.

IMPROVEMENT IN METAL-TURNING TOOLS.

Specification forming part of Letters Patent No. 150,276, dated April 28, 1874; application filed March 26, 1874.

*To all whom it may concern:*

Be it known that I, EDGAR B. BEACH, of West Meriden, in the county of New Haven and State of Connecticut, have invented a new Improvement in Screw-Cutting Tool; and I do hereby declare the following, when taken in connection with the accompanying drawings and the letters of reference marked thereon, to be a full, clear, and exact description of the same, and which said drawings constitute part of this specification, and represent, in—

Fig. 1, a side view, and in Fig. 2 a top view.

This invention relates to an improvement in the screw-cutting tool for which Letters Patent were granted to me January 21, 1868; and, though designed particularly for screw-cutting, may be applied to tools for general turning.

In that patent the cutter was secured by a clamping device dependent upon the friction to hold the cutter.

In practice it has been found that the cutter is liable to be forced down or moved in its seat.

The object of this invention is to avoid the possibility of slipping; and it consists in combining, with the shank fitted to receive the cutter in a recess upon its side, a cutter and clamping-piece with corresponding irregular surfaces, so as to prevent the movement of the cutter in the direction of its length, as more fully hereinafter described.

A is the cutter, formed from a piece of steel, say, two or three inches long, more or less, the edge of the cutter straight and V shape, or corresponding to the thread to be cut, or to the purpose for which the cutter is to be used. B is the shank or cutter holder, having a groove formed upon its side to receive the cutter, and at the angle desired for the cutter to stand, and so as to form a seat, $a$, in front. The rear of the cutter is beveled, and in the recess back of this beveled side a clamping-piece, C, is set, provided with a screw or bolt, D, by which it may be drawn into the said recess, and, by its beveled sides or bearing, force the cutter forward against its bearing, substantially as in my patent before referred to.

In order to prevent the cutter from moving up and down, I construct its rear side with several notches or otherwise irregular surfaces, and the piece C with a corresponding irregular surface, which will interlock with the cutter, and prevent any longitudinal movement thereof until relieved from the connection or interlocking with the piece C.

I claim as my invention—

The cutter A and the shank B, fitted to receive the said cutter, combined with the clamping-piece C and bolt D, the said piece C and the rear side of the cutter made irregular in form, so as to interlock, substantially as and for the purpose specified.

EDGAR B. BEACH.

Witnesses:
A. J. TIBBITS,
J. H. SHUMWAY.